United States Patent [19]

Torpie et al.

[11] 4,413,287
[45] Nov. 1, 1983

[54] WHITE LINE SKIPPING

[75] Inventors: John D. Torpie, Dallas; Robert F. Lozen, Denton; Shing-Chang R. Hsieh, Richardson, all of Tex.

[73] Assignee: Xerox Corporation, Stamford, Conn.

[21] Appl. No.: 368,258

[22] Filed: Apr. 14, 1982

[51] Int. Cl.³ .......................... H04N 1/17; H04N 1/40
[52] U.S. Cl. ..................................... 358/288; 358/257; 358/282
[58] Field of Search ............... 358/288, 257, 282, 256, 358/280

[56] References Cited

U.S. PATENT DOCUMENTS

| | | | |
|---|---|---|---|
| 3,448,207 | 6/1969 | Green | 358/288 |
| 3,502,803 | 3/1970 | Bigenwald | 358/288 |
| 3,902,009 | 8/1975 | Perreault | 358/288 |
| 3,952,144 | 4/1976 | Kolker | 358/282 |
| 3,955,045 | 5/1976 | Ford | 358/288 |
| 4,329,717 | 5/1982 | Logie | 358/282 |

*Primary Examiner*—Howard Britton
*Attorney, Agent, or Firm*—Franklyn C. Weiss

[57] ABSTRACT

A white line skipping technique for data reduction is disclosed for reducing facsimile transmission time. Video processing for white line skipping centers around the use of a five element solid state linear array. The photosensitive area for each of the five elements corresponds to a single picture element for the defined resolution parameters. VID 0 is the active video signal and is processed in the normal manner for transmission. VID 1 through VID 4 comprise the look ahead scan elements. The slicing level is derived from the VID 0 peak detector which controls the video automatic gain control. Any black video elements encountered during a scan line causes a flip-flop to be set. At the end of each scan line, corresponding to one complete drum revolution, and during the lost time interval, the status of each flip-flop is sampled by the microprocessor to determine whether the scan line is entire white. The flip-flops are then reset for the next scan or drum revolution.

8 Claims, 7 Drawing Figures

WHITE LINE SKIPPING

This invention relates to white line skipping as a data reduction technique for reducing facsimile transmission time. Data reduction is realized by essentially skipping over those lines of scanned video which contain no black video.

BACKGROUND OF THE INVENTION

U.S. Pat. No. 3,502,803 discloses a facsimile graphic communication system wherein the white area on a document or the like is rapidly transported past the scanning station in accordance with the lack of information thereon. White line skipping is provided wherein prescan apparatus and associated stepping devices rapidly step the white or lack of information areas on a document or the like past the optical scanner. Cited in U.S. Pat. No. 3,502,803 is U.S. Pat. No. 3,448,207, which discloses a white line skipping technique for a facsimile system, wherein a document is mounted on a rotating drum arrangement, as opposed to a rotating turret type mechanism as disclosed in U.S. Pat. No. 3,502,803.

In accordance with the present invention, a short coded informational signal is generated which identifies a multiplicity of consecutive white scan lines. Facsimile transmission time is reduced by sending during a signal scan time a code which defines the multiplicity of consecutive white scans instead of transmitting the all white scans individually as normal video. Speed up achieved in all white areas is proportional to the largest number of white lines which can be accommodated by the code. White line skipping is primarily dependent upon "looking ahead" in order to determine that future video lines of data are all white. This is readily accomplished for flat bed scanners with electronic memory. Flat bed scanning involves limited mechanical freedom due to high inertia considerations. Electronic memory provides for the ability to scan, process, store, and transmit on demand without consideration of mechanical limitations.

A drum-based facsimile transceiver has certain mechanical limitations. Primary is that the drum rotation rate cannot be varied. This means that the scanning rate is fixed. Carriage movement must be continuous and lines cannot be rescanned. For variable carriage rates, a variable speed motor, such as a stepper, is required. In order to achieve the required "look ahead" a linear scanner array is required. Thus, when a multiplicity of white lines, in terms of two or more, have been determined by the "look ahead" scanner elements, the scanner can be rapidly advanced during the next revolution and thus effectively skip the white areas. Scanning is then resumed at the next line containing black video or unknown scan line which is immediately beyond the look-ahead array.

DESCRIPTION OF THE DRAWINGS

For a more complete understanding of the invention, reference may be had to the following detailed description of the invention in conjunction of the drawings wherein.

DETAILED DESCRIPTION OF THE INVENTION

Figure 1:
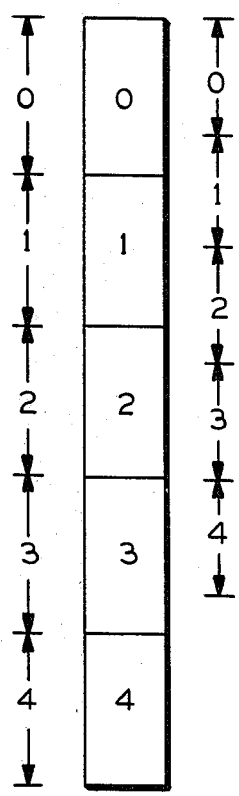
FIG. 1 is a schematic representation of a five element linear array for both fast and standard modes of operation.

The Telecopier ® 455 model as manufactured and marketed by Xerox Corporation, Stamford, Connecticut, is a drum based facsimile transceiver. The model 455 operates in both a standard resolution mode of 96 lines per inch and a fast resolution mode of 72 lines per inch. The scanning array shown in FIG. 1 is optimized for the lower resolution of 72 lines per inch. The impact of using the same array for the standard resolution is seen in FIG. 1. For the standard resolution application, only three look-ahead scan elements are functionally employed and only three and four lines are skipped with the two line skip eliminated.

Figure 2:
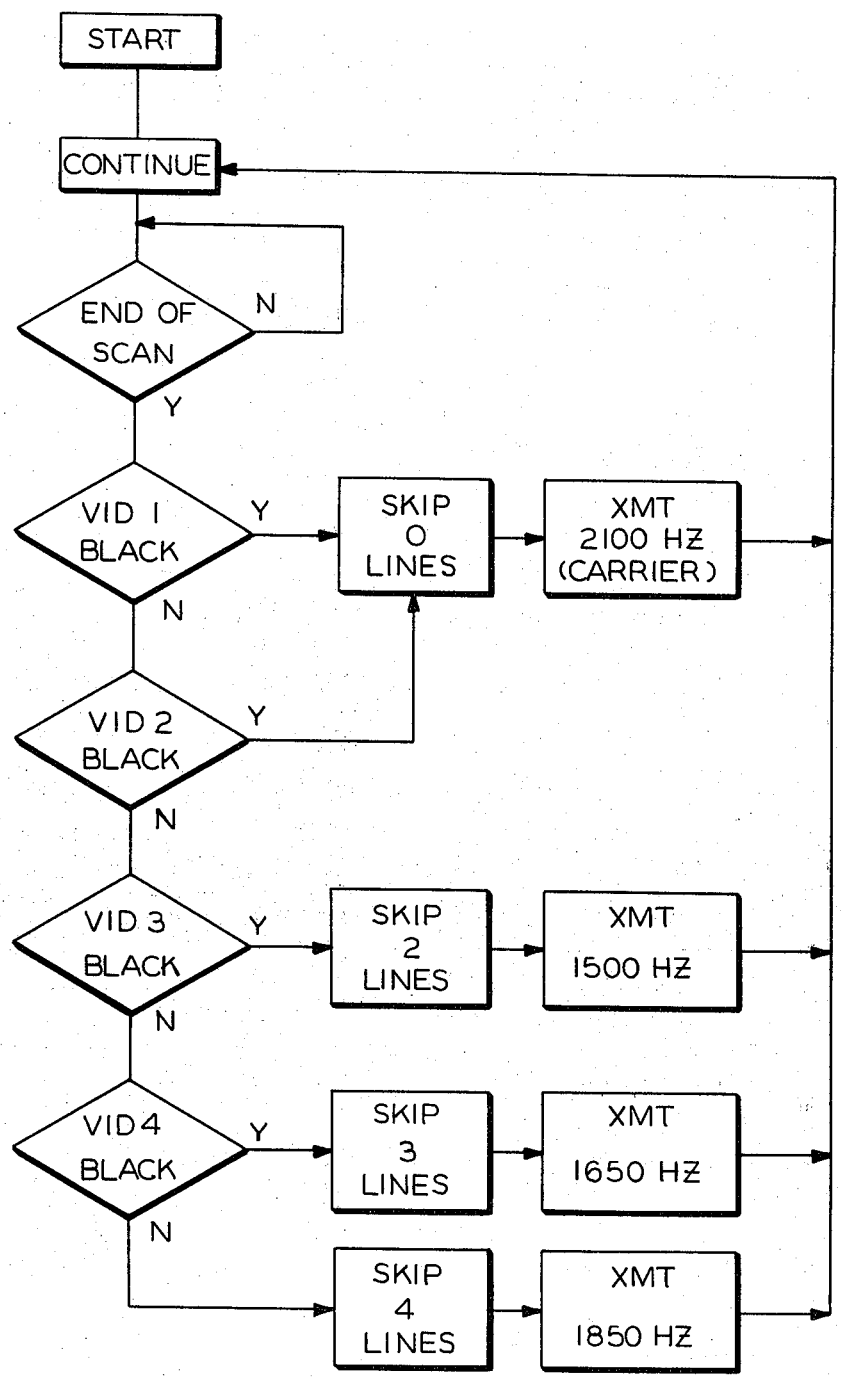
FIG. 2 is a decision chart for white line skipping in the fast mode.

The decision chart for the fast mode is shown in FIG. 2 for the 72 lines per inch mode. The photosensitive area for each of the five elements in the optical array in FIG. 1 corresponds to a single picture element for the defined resolution parameters. VID 0 is the active video signal and is processed in the normal manner for transmission, as will be seen below. VID 1 to VID 4 comprise the look ahead scan elements. VID 1 is immediately ahead by one line. VID 4 is ahead by four scan lines. Thus, referring to FIG. 2, if VID 1 detects a single black signal, then the next line after the data line contains data information and it is not desired that any lines be skipped and thus the 2100 hz carrier signal for the amplitude modulated signal is transmitted. Similarly, if VID 2 also detects black information, then no lines are also skipped and the same 2100 hz signal is transmitted indicating no lines are to be skipped. No lines are skipped even when VID 1 is all white and VID 2 is black due to the fact that one scan line time must elapse for the line skipping signals to be transmitted and the stepper motors actuated; thus, in the VID 1 and VID 2 situations where black is detected, no time would be saved in transmitting a skip signal over merely scanning the line for normal data information. However, if VID 1 and VID 2 both contain no black but VID 3 does detect black, this indicates that VID 1 and VID 2 are all white lines while VID 3 does have data or black information and thus an indication of a skip signal of two lines is to be transmitted as a 1500 hz signal. If VID 1, VID 2, and VID 3 are all devoid of black detected information, but VID 4 detects black information during one scan line, then a skip three lines signal is transmitted as a 1650 hz signal. If VID 1 to VID 4 detect no black information during one scan line, then all of these four lines contain all white information and this is indicative of the necessity to skip four lines of information via a transmitted 1850 hz signal.

Figure 3:
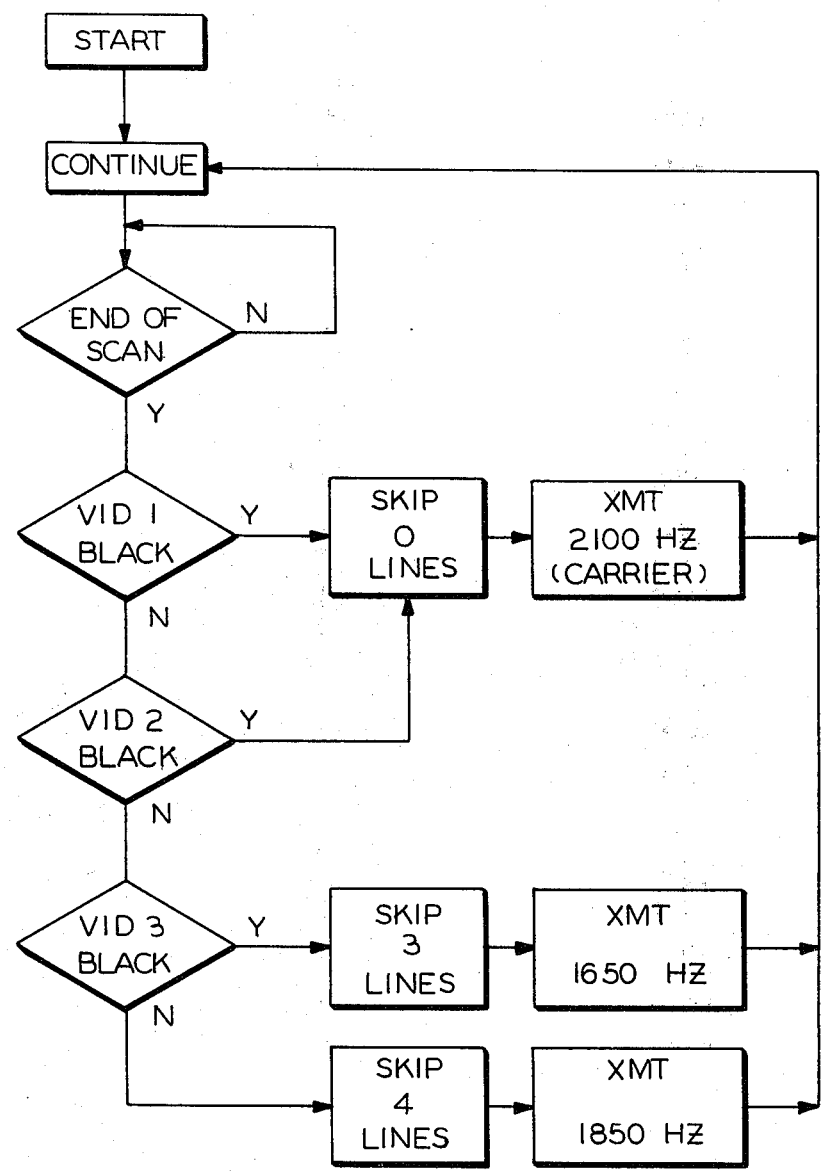
FIG. 3 is a decision chart for white line skipping for the standard mode.

FIG. 3 shows the decision chart for the standard mode of operation in a 96 line per inch resolution. Since the resolution is higher in this application, which means more lines per inch are scanned, the skip decision process is modified to match the vertical resolution with the five element scanner parameters. Thus, only three or four lines are skipped rather than the 0, 1 or 2 in order to effect any savings of transmission time. Thus, in FIG. 3, it is seen that even if VID 1 and VID 2 have detected black information, no skip signals are transmitted via the indication of the normal 2100 hz carrier signal being transmitted. However, if VID 1 and VID 2 detect no black information while VID 3 does detect the black indication along one scan line, then a skip three line indication is transmitted via a 1650 hz signal. While, if neither VID 1, VID 2, or VID 3 contain any detected black information, a skip four line signal is transmitted. As set forth above, in the 96 line per inch mode, only three look ahead scan elements are functionally employed and only three and four lines skipped with the two line skip eliminated.

Figure 4:
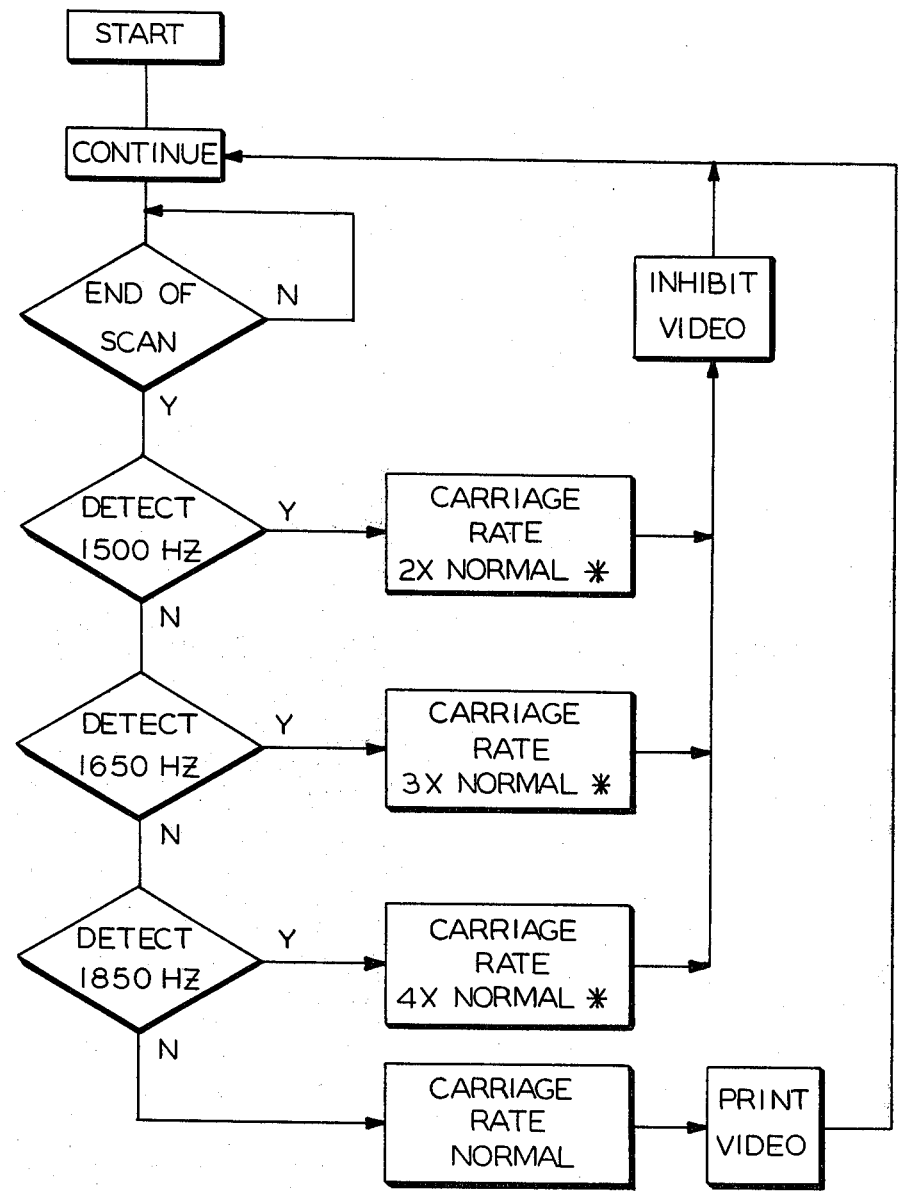
FIG. 4 is a decision chart for lost time signal processing at the receiver.

FIG. 4 shows the decision chart for the receiving procedure in effecting the carriage stepping function in response to the transmitted step signals. Thus, if a 1500 hz signal is detected at the receiver, this is indicative of a two line skip signal and thus the carriage is signaled to skip or advance two lines. If a 1650 hz signal is detected, this is indicative of a three line skip signal being transmitted and such an indication will be transferred to advance the carriage by three lines. If an 1850 hz signal is received, this is indicative of a four line skip and thus the carriage will be advanced by four lines indicating four lines of white information at the transmitting document. If neither the 1500 hz, 1650 hz, or 1850 hz signals are received, that means no skips are indicated, and thus the carriage is allowed to proceed normally and print the video received during the next scan line.

Figure 5:
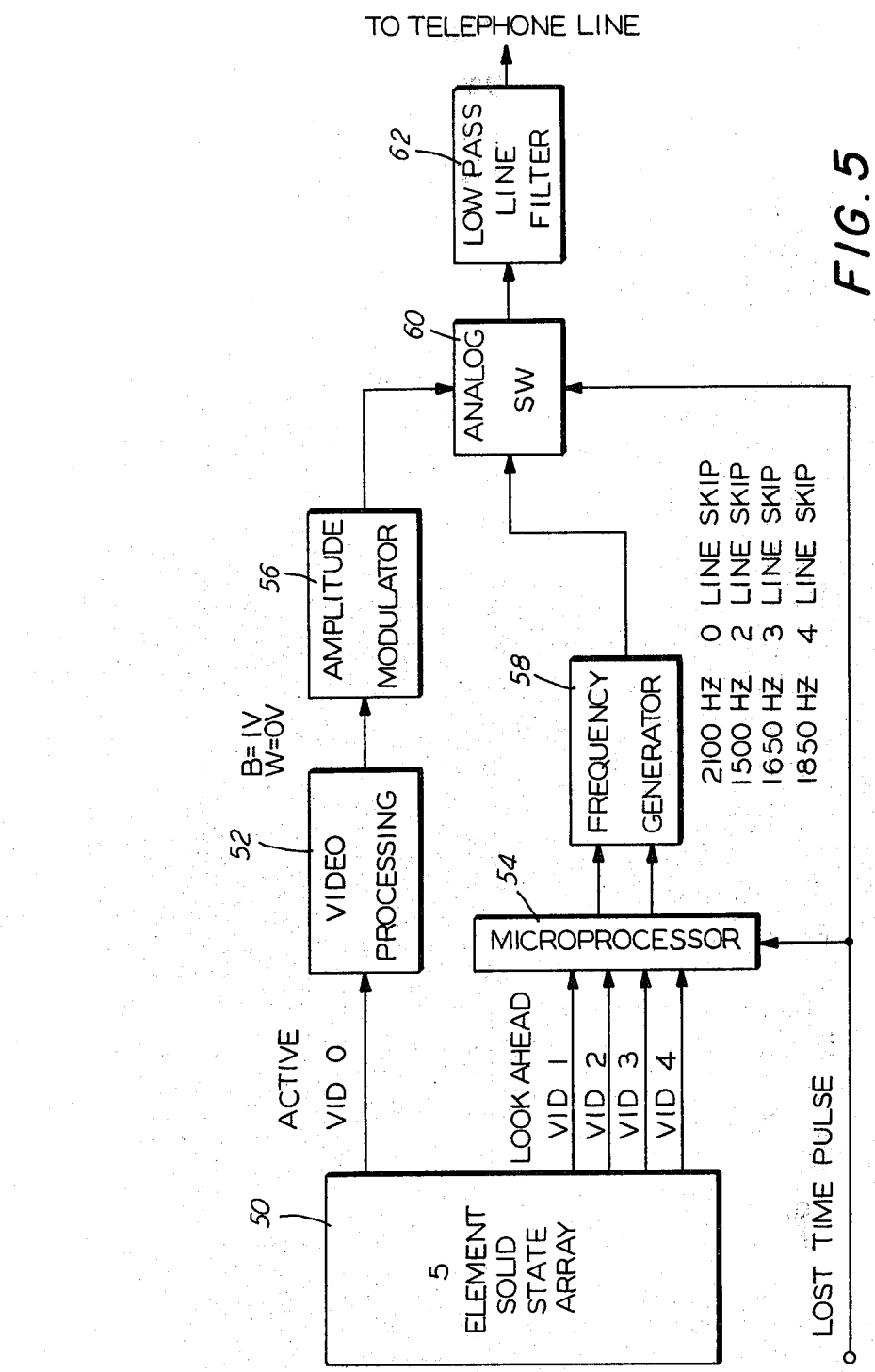
FIG. 5 is a block diagram of the circuitry utilized in effecting white line skipping.

FIG. 5 shows the detector array through the low pass line filter to the telephone line in generating the frequencies necessary to effect the white line skipping in accordance with the principles of the present invention.

As set forth above, VID 0 is the active video signal and is processed in the normal manner for transmission. VID 1 to VID 4 comprise the look ahead scan elements. VID 1 is immediately ahead by one line. VID 4 is ahead by four scan lines. Thus, the solid state array 50 as set forth in FIG. 1 has as one output the VID 0 line which is presented to video processing unit 52, the operation of which is seen more particularly in conjunction with FIG. 6. VID 0 line being the active line while VID 1 through VID 4 are the look ahead lines and are presented to the microprocessor 54. After the active video information has been processed in video processing 52, the signals are then presented to amplitude modulator 56. The output of amplitude modulator 56 is an amplitude modulated signal for presentation to the telephone lines. At the end of each scan line, look ahead video lines are sampled by the microprocessor 54, the output of which is applied to frequency generator 58. Depending upon what combination of video lines have and do not have video information thereon, the frequency generator 58 generates either a 2100 hz signal indicating zero line skip, a 1500 hz signal indicating a two line skip, a 1650 hz signal signal indicating a three line skip, and an 1850 hz signal indicating a four line skip are presented to analog switch 60. The analog switch 60 is controlled by a lost time pulse to allow either the video to be transmitted from the amplitude modulator 56 or the frequency generated signals indicating line skip signals to the telephone line via low pass filter 62. Low pass line filter 62 is utilized to remove any high order components from the generated signals which may be present in the signals which are deleterious to the telephone system.

Figure 6:
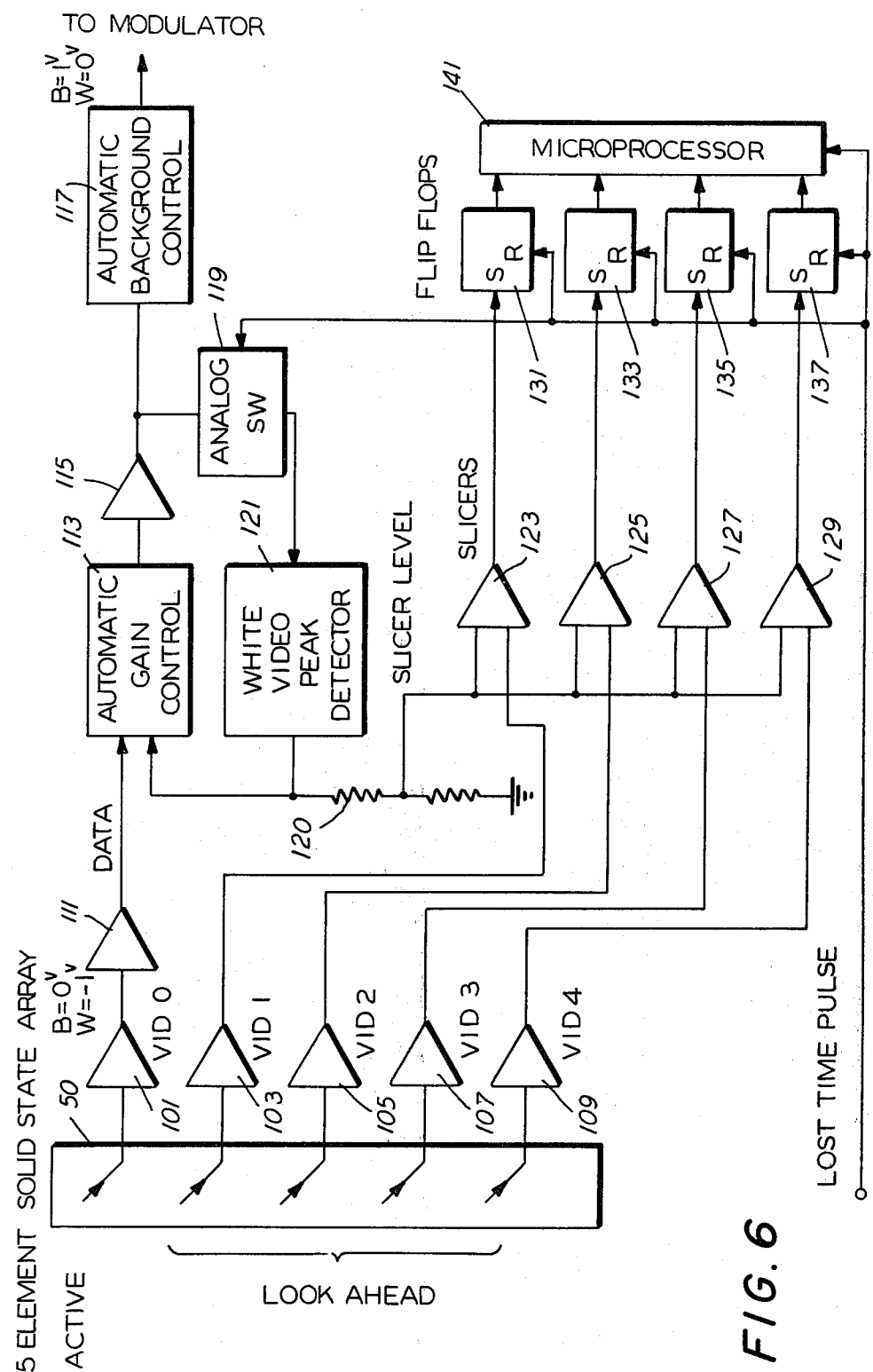
FIG. 6 is a more detailed drawing of certain parts of FIG. 5 in accordance with the principles of the present invention.

FIG. 6 shows the five element solid state array 50 and the video processing circuit 52 as seen above in conjunction with FIG. 5. The active video line amplified by amplifier 101 may be on the solid state array itself. From the array, the VID 0, or active video signal, is presented to the circuitry entitled video processing 52 in FIG. 5. As the signal enters the video processing unit 52, it is amplified via amplifier III for presentation to the automatic gain control unit 113. The automatic gain control unit 113 can be a field effect transistor which controls a varying resistor and is utilized to bring the white level video up to a predetermined fixed level. For this particular application, at this point in the circuit, black is zero volts while a detected white level is adjusted to −1 volt. The output from automatic gain control 113 is amplified by amplifier 115 and is presented both to automatic background control circuit 117 and analog switch 119. The analog switch 119 is disabled by the lost time, or fly back, pulse during scanning during the time when the video may not be well defined due to the fact that the scanning beam may be scanning across a gripper bar and it is not desired to affect the automatic gain control circuitry with such extraneous video light reflection. The analog switch could be an integrated circuit which may be purchased on the open market. The output from the analog switch 119 is presented to white video peak detector 121 which could be a diode and capacitor type of circuit in series wherein the capacitor charges to a peak input signal which will store the highest white level for several scans. The output from the white video peak detector is then fed back to the input of the automatic gain control 113 in order to generate the black and adjusted white voltage signals. The automatic gain control, as opposed to the automatic background control which will be described hereinafter, is utilized to define the white and black extreme signals as components in the system change due to time and wear. That is, the scanning light intensity may change as the illuminator gets old or dirty and also the scanning optics, such as lenses and photodetectors, get dirty, and/or old. Thus to compensate for the aging of these components, the automatic gain control including the analog switch and the white video peak detector circuit is utlized to define the ultimate black and white levels.

The other output from the white video peak detector is presented to a series resistor circuit which taps a slicing level from the background control signal as detected and hereinabove described. This reference level, or slicing level, is approximately ½ volt and is presented to slicers 123, 125, 127, and 129. Video signals from the four look ahead elements are density or amplitude quantized via these slicers 123 through 129. As set forth, the slicing level is derived from the VID 0 peak detector circuit described above which controls the video automatic gain control. This ½ volt signal is approximately midway between white or background video and black video. These slicers could be analog amplifiers with infinite gain well known in the prior art. Thus, any signal between zero and −0.5 volts would be defined as black while any signal between −0.5 and −1.0 volts would be defined as white. Any black information detected in the look ahead arrays VID 1 through VID 4 would generate a signal from the output of slicers 123 through 129 which would set any one of flip-flops 131, 133, 135, or 137. Once any one of these flip-flops is set during a scan line it remains set until reset by the lost time pulse. At the end of each scan line, corresponding to one complete drum revolution, and at the start of the lost time interval, the status of each flip-flop is sampled by microprocessor 141 to determine whether the scan line is entirely white or contains some black video information. The flip-flops 131 through 137 are then reset for the next scan or drum revolution by the lost time pulse.

Transmission of white line skipping information from the scanner (sending) terminal to the printing (receiving) terminal is accomplished by generation and transmission of a unique frequency starting at the beginning of lost time, corresponding to the end of one scan, and continuing through about ⅓ of the next scan time, as set forth above in conjunction with FIG. 5. Lost time is electrically derived from an optical window on the rotating drum and controls analog switch 60 in FIG. 5 which outputs the appropriate frequency derived from the frequency generator 58. The frequency generated and transmitted is in accordance with the number of lines to be skipped. When no lines are to be skipped the 2100 Hz AM carrier is transmitted only during lost time and is followed by video starting at the beginning of the next scan time.

An entire scan time, corresponding to one drum revolution, is allocated to a white line skipping operation. The purpose is to enable the scan head, which is mounted on a carriage, to advance to the next known line containing black video or to the scan position immediately beyond the range of look ahead elements, which in this case is four scan lines. Normal operation is then resumed for the next scan. If four lines were skipped, the video content of the next line to be scanned is unknown. Therefore, the scan line is processed and transmitted as normal video. Look ahead also takes place.

The maximum speed up that can be realized in an all white area is determined as follows:
four lines skipped
one line transmitted normally.

$$\text{Speed-up} = \frac{\text{number lines transmitted}}{\text{number scan times}} = \frac{4+1}{1+1} = 2.5$$

Thus, the maximum speed up is 2.5 to 1 in all white areas.

The signals which have been generated in microprocessor 141, in FIG. 6, are now presented to frequency generator 58 as seen and described above in relation to FIG. 5. The output from aplifier 115 in FIG. 6 is presented to the automatic background control circuit 117. This automatic background control signal is different from the automatic gain control signal as set forth above, in that the automatic background control signal now controls the voltage levels in accordance with information on particular documents. As set forth above, the automatic gain control 113 is concerned with inherent changes to circuitry of the system wherein lamp intensity changes, etc. The automatic background control circuit can comprise a forward biased diode with an associated capacitor. The output from the automatic background control is a zero volt signal indicating white and a one volt signal indicating black. The automatic background control signal defines the lightest level on the document as white. Thus, data information of one color presented on a background of another color will be defined as the data being black or one volt and the lightest color being defined as white or zero volts. This signal from the automatic background control 117 in FIG. 6 is then presented to amplitude modulator 56 in FIG. 5 for further processing as outlined above.

Figure 7:
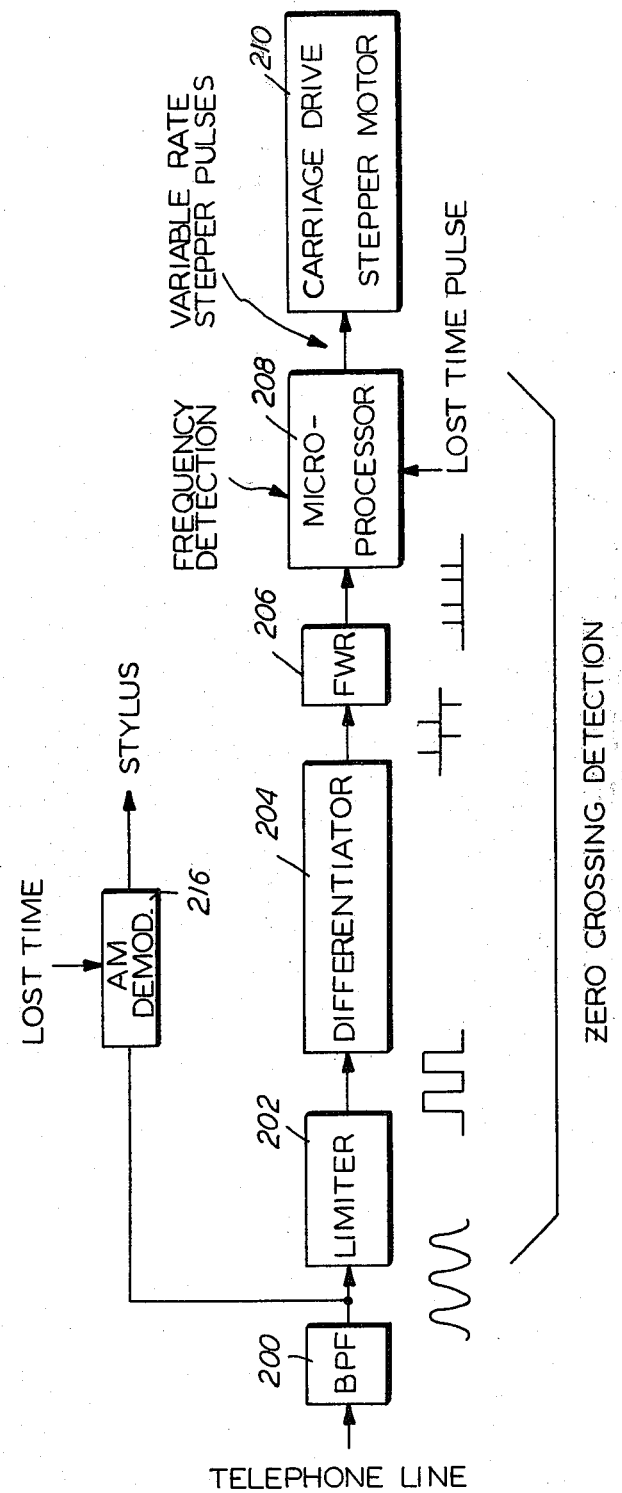
FIG. 7 is a block diagram of the receiver utilizing white line skipping.

At the model 455 receiver, the incoming line frequency is examined during lost time, as shown in FIG. 7. If a white line skipping frequency is detected, a faster advance of the carriage with its printing stylus is initiated for that scan. Functionally, this is performed in the same manner as that at the transmitter in terms of increasing pulse rate to the carrier stepper motor. The video recording is inhibited at this time in keeping with the fact that scans have already defined as being all white. This is necessary since the incoming signal does not correspond to white video and may occupy part of the scan time. A no white line skipping indication is 2100 hz and corresponds to the amplitude modulated carrier frequency. Detection of anything but a white line skipping frequency, by definition, results in demodulation and recording of the incoming signal for that scan.

In FIG. 7, the frequency signals can be seen to be received from the telephone line and is presented to band pass filter 200. The band pass filter operates to exclude signals which may have appeared on the telephone line as noise and which are unnecessary and undesirable to the operation of the receiving circuit. The received signals are then presented to limiter 202 which is in effect a very high gain amplifier which effectively converts the sine wave input signals to a square wave signal all of equal amplitude. From the limiter 202, the signals are passed to differentiator 204 which generates alternate pulses every time the signals generated by limiter 202 cross the zero axis line. From differentiator 204, the signals are presented to full wave rectifier unit 206 wherein all the signals are converted to positive pulses such that the output from FWR unit 206 are positive spikes on the positive side of the zero axis line. These signals vary in frequency depending upon the applied frequency of the signal received over the telephone line. This entire operation is essentially a zero crossing detection system (220) wherein it is interested to detect the frequency of the signals being transmitted in order to effect the line scanning operation in accordance with the principles of the present invention. The actual data would be presented to an AM demodulator circuit in order to demodulate the amplitude modulated video signal, or active signal, as herein described above. The output from microprocessor 208 is the signal presented to the carriage drive stepper motor 210 in order to advance the carriage the requisite number of scan lines as determined at the transmitter. The microprocessor 208 as well as the microprocessor 141 in FIG. 6 could be a well known type of microprocessor as model 8085 manufactured by Intel Corporation. The microprocessor would have stored in it, in its random access memory on board the microprocessor chip itself, certain instructions for use in generating the enabling signals to the frequency generator 58 in FIG. 5 and to the carriage drive stepper motor 210 in FIG. 7 in accordance with the logic instructions depending upon the number of lines detected and to be ultimately skipped at the receiver.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

We claim:

1. A white line skipping system for use in data reduction in a facsimile transmission system, wherein the improvement is characterized by:
   optical detector array means (50) including an element for detecting the active data during a single scan line and a plurality of look ahead elements for detecting only the presence of data along a plurality of scan lines,
   video processing means (52) for receiving the active data from said optical detector array means and processing said data into an acceptable video signal,
   mircoprocessor means (54) for receiving and sampling the look ahead data and generating enabling signals depending on the combination of look ahead data lines which have and do not have video information thereon,
   frequency generator means (58) responsive to said enabling signals from said microprocessor means (54) for generating a predetermined frequency signal for each of said combination of look ahead lines containing video information,
   means (56) for modulating the video signals as processed by said video processing means, and
   switch means (60) for transmitting either said modulated video signals or said predetermined frequency signals.

2. The white line skipping system as set forth in claim 1 wherein said video processing means comprises
   automatic gain control circuit means (113) to define the white and black signal levels in accordance with the video scanned to compensate for internal deviations of system components, and
   automatic background control circuit means (117) coupled to said automatic gain control means to define the white and black signal levels in accordance with lightest and darkest levels respectively, in the video scanned.

3. The white line skipping system as set forth in claim 2 wherein said automatic gain control circuit means (113) comprises
   circuit means (113) for raising the white signal information in the video scan signals to a predetermined voltage level, and
   white video peak detector circuit means (121) coupled to the output of said circuit means (113) for storing the highest white level in said video scan signal, the output of said white video peak detector circuit means being fed back to the input of said circuit means (113).

4. The white line skipping system as set forth in claim 3 further including
   analog switch means between the output of said automatic gain control circuit means (113) and the input to said video peak detector circuit means (121) to disable said video peak detector circuit means (121) during the lost time during said scanning.

5. The white line skipping system as set forth in claim 4 further including
   resistor circuit means (120) also coupled to the output of said white video peak detector circuit means (121) to establish a slicing voltage level between the white and black signal levels defined by said automatic gain control circuit means (113),
   a plurality of slicing circuit means (123 ... 129) coupled to said resistor circuit means (120) and said plurality of look ahead elements for density or amplitude quantizing the data detected on said look ahead scan lines, and
   a plurality of flip flop circuit means (131 ... 137) coupled to said plurality of slicing circuit means (123 ... 129) and each responsive to any amplitude quantized signal recognized as black by being placed in a set state by said signal, said microprocessor means (54) being responsive to the set signal state of said plurality of flip flop circuit means for generating said enabling signals.

6. The white line skipping system as set forth in claim 5 further including
   lost time pulse generation means indicative of the lost time between said video scan lines, said lost time pulse means resetting said plurality of flip flop circuit means (131 ... 137) during each said lost time between said video scan lines and disabling said analog switch means (119).

7. In a white line skipping system for use in data reduction on a facsimile transmission system, wherein amplitude modulated signals are transmitted representative of the active video information scanned and discrete frequency signals are transmitted representative of lines to be skipped, wherein the receiver is characterized by
   first circuit means (216) for receiving and demodulating the transmitted amplitude modulated signals into the active video information scanned,
   second circuit means (220) for receiving and detecting said discrete frequency signals,
   microprocessor means (208) coupled to said first circuit means (216) for sampling the discrete frequency signals and generating enabling signals which are indicative of the number of scan lines to be skipped, if any, and
   carriage drive stepper motor means (210) responsive to said microprocessor means (208) for advancing the indicated number of scan lines, said carriage drive stepper motor means being responsive to said enabling signals from said microprocessor means (206) only during the lost time of said between separate scan lines.

8. The white line skipping system as set forth in claim 7 wherein said second circuit means (220) comprises
   band pass filter circuit means (200) to exclude extraneous signals from said received signals,
   limiter circuit means (202) for amplifying and converting said received signals into essentially square wave signals,
   differentiator circuit means (204) for generating a pulse every time the square wave signals cross a predetermined voltage level, and
   full wave rectifier circuit means (206) for converting the pulse generated by said differentiator circuit means (204) into pulses of one polarity.

* * * * *